United States Patent
Saeger et al.

(10) Patent No.: US 11,021,189 B2
(45) Date of Patent: Jun. 1, 2021

(54) SYSTEM AND METHOD FOR OPERATING A VEHICLE HAVING AN ACTIVE ROLL CONTROL SYSTEM

(71) Applicant: Ford Global Technologies, LLC, Dearborn, MI (US)

(72) Inventors: Martin Saeger, Pulheim (DE); Simon Baales, Cologne (DE); Michael Seemann, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 607 days.

(21) Appl. No.: 15/411,750

(22) Filed: Jan. 20, 2017

(65) Prior Publication Data
US 2017/0210420 A1 Jul. 27, 2017

(30) Foreign Application Priority Data
Jan. 22, 2016 (DE) .......................... 102016200927.3

(51) Int. Cl.
| B62D 15/02 | (2006.01) |
| B62D 7/15 | (2006.01) |
| B62D 6/00 | (2006.01) |
| G07C 5/02 | (2006.01) |
| G07C 5/08 | (2006.01) |

(52) U.S. Cl.
CPC ........... B62D 15/025 (2013.01); B62D 6/002 (2013.01); B62D 7/159 (2013.01); B62D 15/021 (2013.01); G07C 5/02 (2013.01); G07C 5/0808 (2013.01)

(58) Field of Classification Search
CPC ...... B62D 15/025; B62D 7/159; B62D 6/002; B62D 15/021; B62D 5/046; B62D 6/00; G07C 5/02; G07C 5/0808
See application file for complete search history.

(56) References Cited

U.S. PATENT DOCUMENTS

| 8,417,417 B2 * | 4/2013 | Chen ............... B60W 30/18145 |
| | | 701/36 |
| 8,645,022 B2 * | 2/2014 | Yoshimura ........ B60W 50/0225 |
| | | 701/32.8 |
| 2002/0139599 A1 | 10/2002 | Lu et al. |
| 2008/0109135 A1 | 5/2008 | Lemmen et al. |

(Continued)

FOREIGN PATENT DOCUMENTS

| DE | 102008000590 A1 | 9/2009 |
| DE | 112007002800 B4 | 9/2009 |

(Continued)

*Primary Examiner* — Hunter B Lonsberry
*Assistant Examiner* — Daniel M. Robert
(74) *Attorney, Agent, or Firm* — Raymond L. Coppiellie; Burgess Law Office, PLLC

(57) ABSTRACT

A method for operating a motor vehicle having an active roll control and an active steering system designed to map a steering-wheel setting angle predetermined by a driver of the motor vehicle in accordance with a predetermined steer response onto a steer angle of the motor vehicle. The method includes operating the active steering system in a normal operating mode having a normal steer response and upon determining an active roll control fault operating the active steering system in a fallback operating mode in accordance with an fallback steer response, the fallback steer response different from the normal steer response.

14 Claims, 2 Drawing Sheets

(56) References Cited

U.S. PATENT DOCUMENTS

| | | | |
|---|---|---|---|
| 2009/0248248 A1 | 10/2009 | Akuta et al. | |
| 2009/0319114 A1* | 12/2009 | Takenaka | B60W 10/18 |
| | | | 701/48 |
| 2010/0191423 A1 | 7/2010 | Koyama et al. | |
| 2010/0280716 A1* | 11/2010 | Shah | B62D 6/007 |
| | | | 701/42 |
| 2013/0158798 A1* | 6/2013 | Igarashi | B62D 6/00 |
| | | | 701/37 |
| 2013/0284128 A1 | 10/2013 | Beyer | |
| 2014/0012469 A1* | 1/2014 | Kunihiro | B62D 6/001 |
| | | | 701/41 |
| 2014/0195115 A1* | 7/2014 | Muller | B60G 21/00 |
| | | | 701/37 |
| 2015/0183457 A1* | 7/2015 | Lee | B62D 6/006 |
| | | | 701/43 |
| 2018/0236989 A1* | 8/2018 | Lian | B60L 7/18 |

FOREIGN PATENT DOCUMENTS

| | | | | |
|---|---|---|---|---|
| DE | 102009049635 A1 | | 4/2011 | |
| DE | 102011010845 B3 * | | 6/2012 | B60G 17/0162 |
| DE | 102011010845 B3 | | 6/2012 | |
| DE | 102012212616 A1 | | 1/2013 | |

\* cited by examiner

SYSTEM AND METHOD FOR OPERATING A VEHICLE HAVING AN ACTIVE ROLL CONTROL SYSTEM

CROSS-REFERENCE TO RELATED APPLICATIONS

Not Applicable.

BACKGROUND OF THE INVENTION

1. Field of the Invention

The present invention relates generally to a method for operating a motor vehicle having an active roll control system and an active steering system.

2. Description of Related Art

Roll control systems in motor vehicles counteract a rolling motion of the vehicle when a bump in the road or a cornering maneuver causes spring compression or spring rebound of a wheel. The roll control system transmits vehicle body movement, generated by the spring, to the opposite side of the vehicle, and a torsional property of the roll control system damps and delays the transmission creating a more favorable dynamic response. Roll control systems can be provided on the front axle, on the rear axle, or on both the rear and front axles of the motor vehicle.

Active roll control systems (ARC) are becoming increasingly prevalent in vehicles having a high center of gravity, and in sports vehicles, to assist in roll control. Active roll control systems adapt the roll properties of the vehicle to different driving situations and driver preferences by changing the mechanical response of the roll control system. For example, a "more direct" or "harsher" transmission may be desired in a "sporty" operating mode, or the understeer response of the motor vehicle in a cornering maneuver can be influenced.

Active steering systems loosen the rigid coupling between steering-wheel setting angle and steering angle. Superposition steering systems are an example of active steering systems that add or subtract an additional angle to change the steering angle input of the steering wheel. For example, a steer angle predetermined via the steering wheel has superposed on it, using a steering angle actuator such as a superposition gearbox one, or more additional steer angles predetermined by an active vehicle system. The resultant steer angle is the actual steering angle of the motor vehicle. Assistance systems can intervene in the steering of the motor vehicle, to provide comfort functions or safety functions. A steer-by-wire steering system, in which there is no mechanical connection between the steering wheel and the steered wheels, is also an example of an active steering system. In this system, the steering-wheel setting angle is registered by sensors, and the steering system has the resultant steer angle, modified under presets where appropriate, includes superposition steer angles of assistance systems, applied by a motor or steering angle actuator.

SUMMARY OF THE INVENTION

A method for operating a motor vehicle having an active roll control system and an active steering system operative to map a steering-wheel setting angle predetermined by a driver of the motor vehicle including operating the active steering system in a normal operating mode in accordance with a normal steer response. During operation checking for a malfunction of the active roll control system and if a malfunction of the active roll control system is established, operating the active steering system in a fallback operating mode in accordance with a fall back steer response, the fallback steer response different from the normal steer response.

Further areas of applicability of the present invention will become apparent from the detailed description provided. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
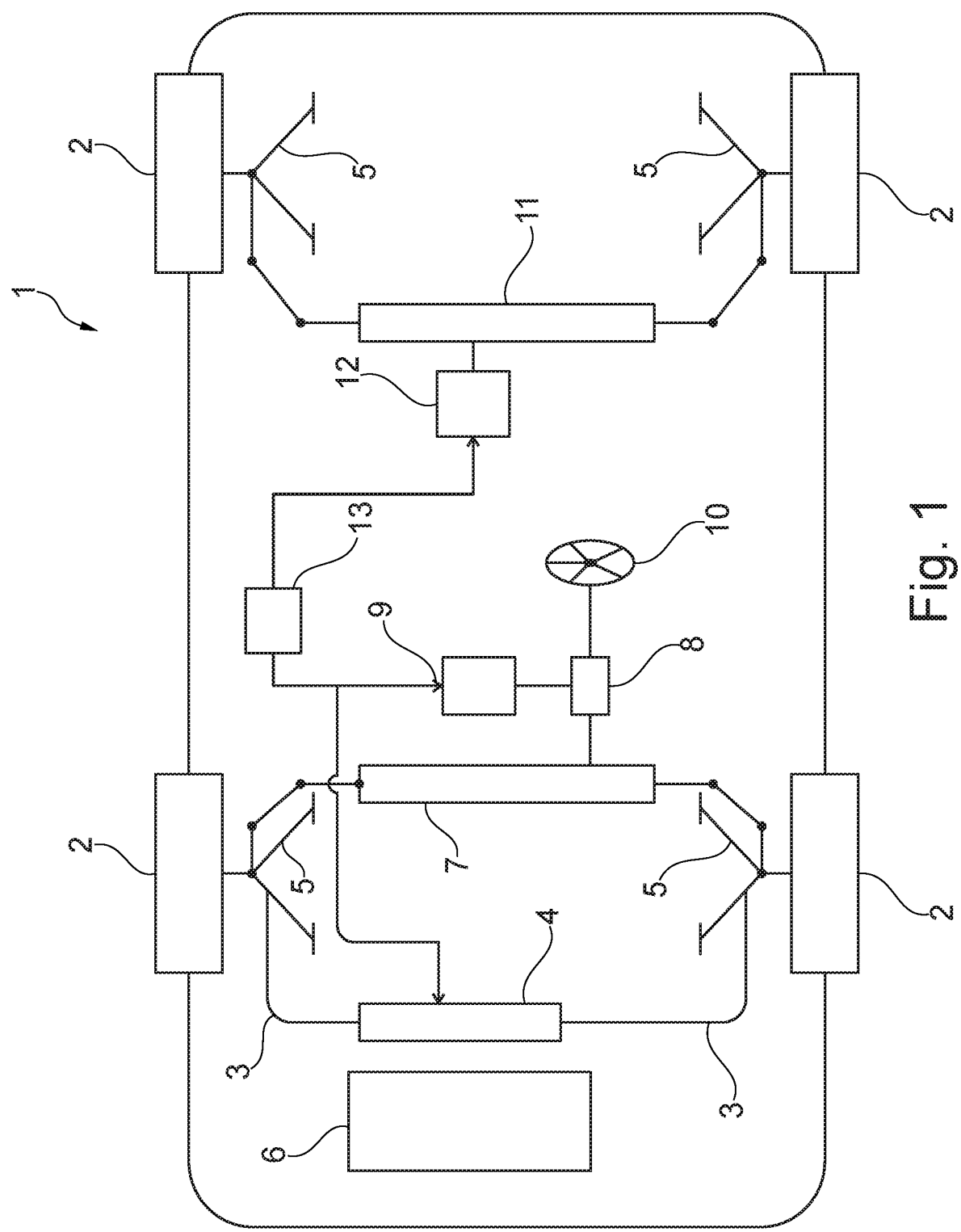
FIG. 1 is a schematic, block diagram of a motor vehicle according to an embodiment of the invention.

FIG. 1 shows a motor vehicle 1 including wheels 2 of the motor vehicle 1 mounted on corresponding independent suspensions 5. A rigid rear axle may also be used with the rear wheels 2 mounted on the rear axle in a known manner. The motor vehicle 1 includes an engine 6 arranged at the front; however, other engine configurations and mountings are also contemplated.

The motor vehicle 1 an active roll control system, shown in the present embodiment as a lateral stabilizer 3, equipped with an actuator 4. The lateral stabilizer may be referred to as an active lateral stabilizer. As shown, the lateral stabilizer 3 engages the front wheels 2 of the motor vehicle 1. A lateral stabilizer may also be used with the rear wheels 2. The lateral stabilizer 3 connects, at its opposing ends, the wheel suspensions 5 of the front wheels 2, and transmits a displacement of a front wheel 2 to the corresponding front wheel 2 on the opposite side of the vehicle. An actuator 4 may control the transmission to obtain a desired dynamic response of the motor vehicle 1. A control unit or controller 13 receives a signal from and detects the existence of a malfunction of the lateral stabilizer 3, for example a failure of the actuator 4, and implements through the active steering system suitable measures to preserve the dynamic handling and response of the motor vehicle 1 within the scope of a fallback operating mode.

The control unit 13 also connects to an active steering system of the motor vehicle 1, which in the disclosed embodiment, shows an active front-axle steering system and an active rear-axle steering system. In an alternative embodiment only an active front-axle steering system or only an active rear-axle steering system may be provided.

The active front-axle steering system in the present embodiment is a superposition steering system including a superposition gearbox 8 connected to a steering wheel 10 and to a servomotor 9 ordinarily, an electric servomotor. The superposition gearbox 8 combines a steering-wheel setting angle, predetermined by a driver based on the steering wheel 10, and a superposition angle, generated by the servomotor 9, and transmits the resultant steering angle to a front rack 7 or corresponding device of a front-axle steering system. In addition to a superposition steering system, the method can also be used with other types of active front-axle steering system, for example a steer-by-wire steering system.

In a further embodiment, the motor vehicle 1 includes an active rear-axle steering system having an electric motor 12 that variably adjusts a rear-axle steer angle of the rear wheels 2 via a rear rack 11. The control unit 13 controls the servomotor 9 and the electric motor 12 based on appropriate control signals and the motors 9, 12 change the orientation of the wheels 2 as predetermined by the control unit 13. The control unit 13 may, in addition, influence a transient response of the active lateral stabilizer 3 based on suitable control signals to the actuator 4. The control unit 13 may be a component already provided for other purposes, for example an engine control unit of the engine 6 or a comparable device.

Figure 2:
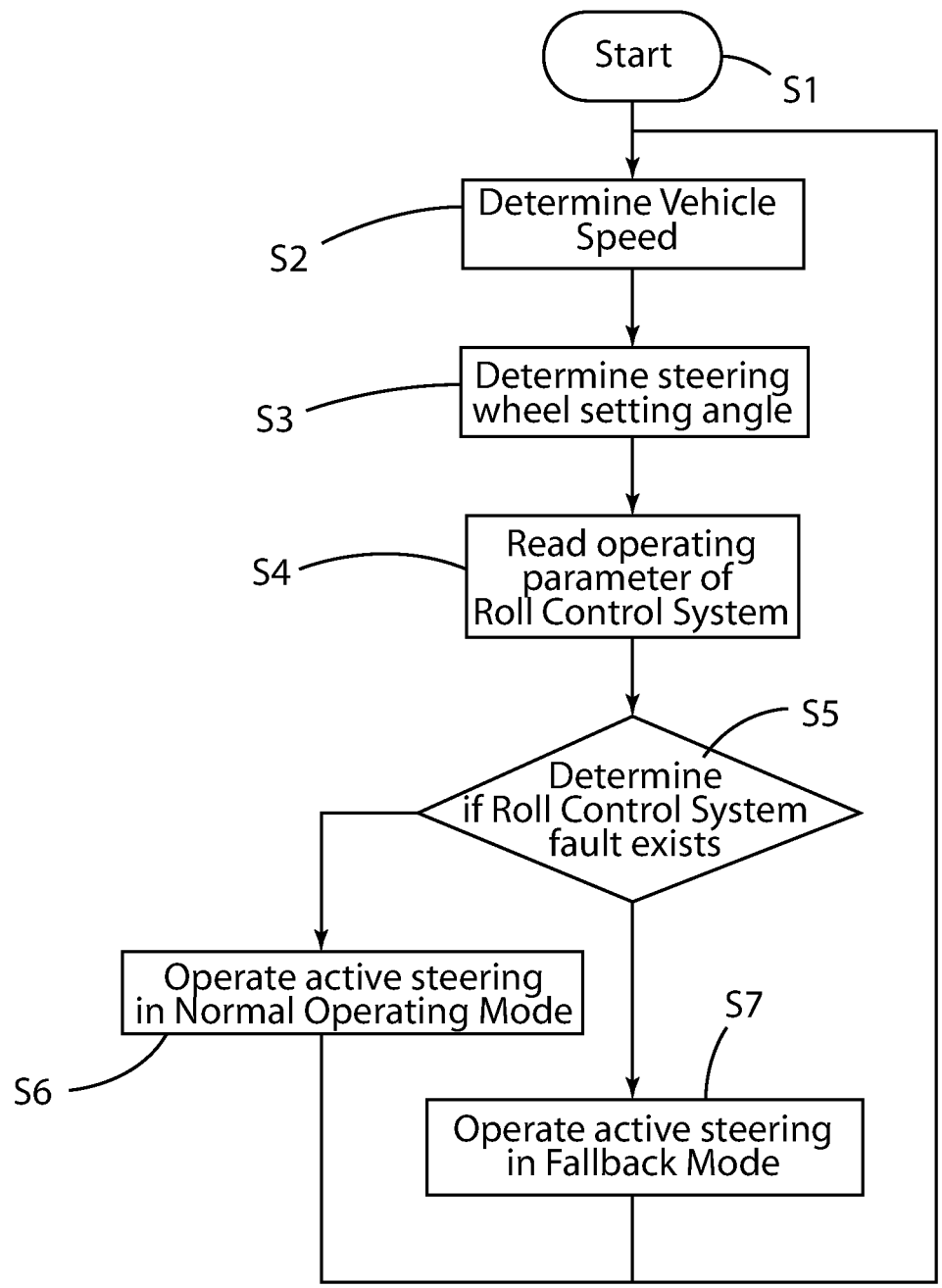
FIG. 2 is a flowchart of a schematic sequence of an exemplary embodiment of the method according to the invention.

FIG. 2 shows an embodiment of a method according to the invention. The method starts in the first step S1; the next step S2 determines the speed of the motor vehicle. In one embodiment, the wheel speeds of the wheels of the motor vehicle determine vehicle speed. The next step S3 determines a steering-wheel setting angle of the steering wheel of the motor vehicle from which a steer preset of the driver follows. The next step S4 reads out a suitable operating parameter of the roll control system, for example an operating parameter of the lateral stabilizer 3, and the step S5 checks for a fault of the roll control system, for example a fault or malfunction of the lateral stabilizer. If no fault is present then the active steering system operates in a normal operating mode, wherein a lateral acceleration predetermined by the driver based on the steering-wheel setting angle and speed of the vehicle builds up at a defined rate. Instead of an operating parameter of the roll control system, a fault of the roll control system may also be determined, without restriction, based on other suitable parameters of the motor vehicle 1.

When a fault of the roll control system, for example the lateral stabilizer 3, is present, step S5, the active steering system operates in a fallback operating mode, wherein the lateral acceleration predetermined by the driver based on the steering-wheel setting angle and the speed of the vehicle builds up at a lower rate, to avoid an intense excitation of the system and reduce the possibility of rolling the motor vehicle.

In addition, acoustic and/or visual signals draw the driver's attention to the fault, the changing the dynamic response of the motor vehicle, and possibility of an accident.

Steps S2 to S4 can be performed simultaneously or in succession in arbitrary sequence, and with respectively differing frequency.

The method and system provides improved dynamic response of a motor vehicle having roll control system, including a roll control system having an active lateral stabilizer, and an active steering system when the roll control system exhibits a fault response. The method provides roll resistance and a desired understeer response of the motor vehicle during a failure of the active roll control system.

In one embodiment, the method maps a steering wheel 10 setting angle predetermined by a driver of the motor vehicle 1 according to a predetermined steer response onto a steer angle of the motor vehicle 1. As shown in FIG. 2 the active steering system operates in a normal operating mode with a normal steer response. The method checks for a malfunction of or fault in the active roll control system. Upon determining the existence of a fault or malfunction of the active roll control system the active steering system operates in a fallback operating mode having an fallback steer response, that is a steer response different from the normal steer response. In the present example, the active roll control system includes an active lateral stabilizer and the method monitors the active lateral stabilizer, including reading the operating parameters of the active lateral stabilizer, to determine existence of an active lateral stabilizer fault or malfunction.

The normal steer response and the fallback steer response are examples of steer responses adapted to different dynamic conditions existing in a motor vehicle 1 having an active roll control system including, for example, an operational lateral stabilizer 3 or a failed lateral stabilizer 3. The steer response is the manner that steer inputs, made by the driver based on the steering-wheel setting angle or the time derivative thereof of first order and, under certain circumstances, of higher order, are mapped onto the steer angle of the motor vehicle 1. Active steering systems cancel the rigid coupling of steering-wheel setting angle and steer angle, permitting application of a superposition angle to the steering system to generate a handling response of the motor vehicle expected by the driver or, depending on the situation, to mitigate driving errors or unexpected hazardous situations. When mentioned in connection a motor vehicle steer angle means, in the case of front-axle and rear-axle steering systems present simultaneously, the angle resulting from a combination of front-axle and rear-axle steer angles.

A failure of the active roll control system, for example a failure of the active lateral stablilzer, may cause the motor vehicle 1 to display a roll response and a yaw response unfamiliar and disadvantageous for the driver in terms of vehicle dynamics. These result in restrictions of comfort and, in extreme driving situations, a reduction of the dynamic stability of the motor vehicle. If a malfunction of or a fault in the active lateral stabilizer occurs, an electric motor of the lateral stabilizer is short-circuited or if adjustable shock absorbers are used, they are placed in a hard setting. Short-circuiting of the electric motor requires an additional, self-conducting relay supplied with power during the entire operating period resulting in increased fuel consumption, weight and, under certain circumstances, increased packaging space for the components. The effect of the adjustment of the shock absorbers also depends on the height of the center of the gravity of the motor vehicle and on specific properties of the shock absorbers themselves.

The mechanical response of a motor vehicle 1 with respect to its longitudinal axis can be interpreted as a system capable of oscillation, the oscillation properties determined by the operational capability the active roll control system, for example the lateral stabilizer 3. If the lateral stabilizer 3 fails, oscillations arising during the operation of the motor vehicle 1 may be damped less strongly and conducted from one side of the vehicle to the other. In addition, the yaw response of the motor vehicle 1 is influenced by the lateral stabilizer and a desired understeer response in certain situations is obtained via the lateral stabilizer or with the participation thereof.

The disclosed embodiment provides dynamic stability by decreasing the probability of the occurrence of undesirably strong excitations of a system capable of oscillation or oversteer, and takes advantage of the presence of an active steering system. As disclosed, upon determining a malfunction of or fault in the active roll control system the method provides for changing the steer response from a normal steer response in a normal operating mode to a fallback steer response in a fallback operating mode.

The fallback steer response includes at least one superposition angle that can be superposed on the steering-wheel setting angle wherein the steer angle of the motor vehicle is generated depending on the steering-wheel setting angle and on the at least one superposition angle. The superposition angle generated in the fallback steer response differs from a superposition angle generated in a corresponding driving situation with a normal steer response. For example, the superposition angle of the fallback steer response can limit a lateral acceleration arising in a cornering maneuver. The superposition angle generated in the fallback operating mode may, in particular, have an algebraic sign opposite to the steering-wheel setting angle wherein it may partially compensate the steer preset of the driver. For example, in the fallback operation mode the active steering system operates to control lateral acceleration of the vehicle wherein lateral acceleration of the vehicle builds at a slower rate than the lateral acceleration of the vehicle in the normal operation mode.

The active steering system builds up a lateral acceleration of the motor vehicle predetermined by the driver based on the steering-wheel setting angle at a first rate in the fallback operating mode, and at a second rate in the normal operating mode, the first rate being lower than the second rate. Accordingly, the time derivative of the lateral acceleration is limited reducing, beyond a certain extent, an abrupt change of direction of the motor vehicle. Doing so reduces the possibility of the motor vehicle from undergoing an undesirably high excitation of oscillation with respect to the rolling about its longitudinal axis. At the same time, an arbitrarily tight curve radus can be taken advantageously within existing limits, since, unless further restrictions have been provided, the exemplary method reduces the rate of change of the lateral acceleration, that is limits the speed of change of the steer angle and hence the steering into a curve, but not the steer angle predetermined by the driver and attained after a finite time.

Driver steering intensity inputs are also moderated as driver input, in some cases, can be too much. Since the motor vehicle does not immediately follow the driver's steer input, the driver has time for a correction. Combining an unintentionally intense change of direction with a subsequent correction in the opposite direction may cause a motor vehicle to roll. Potential oversteer of the motor vehicle based on driver reaction and corresponding input is delayed in that when operating in the fallback mode the system builds up lateral acceleration at a slower rate. The present embodiment provides additional reaction time to the driver to react to the unexpected steer response of the motor vehicle if failure of the active lateral stabilizer occurs.

Because lateral acceleration also depends on vehicle speed the present embodiment contemplates initiating an automatic braking of the motor vehicle, if in the fallback operating mode, a maximal rate of change of the lateral acceleration is obtained. It is also conceivable to predetermine the maximal rate of change as a function of the speed of the motor vehicle. Similarly, it is possible to cancel the limitation of the rate of change of the lateral acceleration if an override by the driver is established. Such an override can be established, for example, if a further increase of the steering-wheel setting angle by the driver occurs during the limitation, and/or by a braking procedure initiated by the driver.

Operation of the active steering system may include, in particular, operation of an active front-axle steering system. The system may have superposition steering system in which the steering column connected to the steering wheel and a steering intervention generated by a servomotor, connected by a superposition gearbox, act jointly on the steering system.

The active front-axle steering system can be operated in the fallback operating mode with an fallback transmission ratio of the steering-wheel setting angle to the steer angle of the motor vehicle, and in the normal operating mode with a normal transmission ratio of the steering-wheel setting angle to the steer angle, the fallback transmission ratio being greater than the normal transmission ratio. Causing the driver to turn the steering wheel more intensely for a desired curve radius in the fallback operating mode than in the normal operating mode. The driver continues to steer the motor vehicle without delay or other limitation into a curve with small curve radius, but needs a larger steering-wheel setting angle, thereby avoiding unnecessarily tight cornering maneuvers and hence unnecessarily intense excitations to roll, or undesirable oversteer.

In additional embodiments, the active steering system may also include an operation of an active rear-axle steering system. An active rear-axle steering system can be combined with an active front-axle steering system. The active rear-axle steering system can be used to change an angle of the rear wheels on the roadway. As a result, for a given wheelbase tighter curve radii can, for example, be taken if the rear wheels are swiveled in opposing manner to the front wheels, or a steering intervention can be moderated, by the rear wheels being swiveled in the same direction as the front wheels.

A rear-axle steer angle of the motor vehicle in the normal operating mode can be predetermined in accordance with a first rear-axle steer response, and in the fallback operating mode with a second rear-axle steer response, different from the first rear-axle steer response. Also, the steer response of the motor vehicle is influenced in such a manner that in the fallback operating mode there is a lesser excitation of the motor vehicle to roll, and a lower probability of an oversteer.

For example, for a given steering-wheel setting angle the rear-axle steering system in the normal operating mode can have a first rear-axle steer angle applied to it, and in the fallback operating mode can have a second rear-axle steer angle applied to it, in which case a difference between the first rear-axle steer angle and the second rear-axle steer angle has an algebraic sign opposite to the steering-wheel setting angle. This is the case, for example, when in the normal operating mode the rear wheels are swiveled contrary to the setting angle of the front-axle steering system, and in the fallback operating mode are not swiveled. Alternatively, when in the normal operating mode the rear wheels are not swiveled, and in the fallback operating mode are swiveled in the same direction as the front-axle steering. Of course, the steering intervention in respect of the rear-axle steering system can also be undertaken in the normal and fallback operating modes in the same manner, but to an extent that causes a lower lateral acceleration in the fallback operating mode. The limitations, set forth above, of the lateral acceleration or of the rate of change of the lateral acceleration may also find application to the active rear-axle steering system.

The invention has been illustrated and described in detail by means of embodiments of preferred practical forms and is not restricted by the disclosed examples.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for operating a motor vehicle comprising:
providing an active roll control system;
providing an active steering system operative to map a steering-wheel angle predetermined by a driver of the motor vehicle according a predetermined steer response to a steer angle of the motor vehicle, the predetermined steer response including a normal steer response and a fallback steer response;
operating the active steering system in a normal operating mode in accordance with the normal steer response;
checking for a malfunction of the active roll control system; and
if a malfunction of the active roll control is detected, operating the active steering system in a fallback operating mode in accordance with the fallback steer response, the fallback steer response different from the normal steer response; wherein operating the active steering system includes operation of an active front-axle steering system; wherein the active front-axle steering system is operated in the fallback operating mode with a fallback transmission ratio of the steering-wheel setting angle to the steer angle, and in the normal operating mode with a normal transmission ratio of the steering-wheel setting angle to the steer angle, the fallback transmission ratio being greater than the normal transmission ratio.

2. The method of claim 1 wherein at least one superposition angle is superposed on the steering-wheel setting angle in accordance with the fallback steer response, and the steer angle of the motor vehicle is generated in a manner depending on the steering-wheel setting angle and on the at least one superposition angle.

3. The method of claim 1 wherein the active steering system in the fallback operating mode builds up a lateral acceleration of the motor vehicle, predetermined by the driver based on the steering-wheel setting angle and a vehicle speed, at a first rate, and wherein the active steering system in the normal operating mode builds up the lateral acceleration of the motor vehicle, predetermined by the driver based on the steering-wheel setting angle, at a second rate, the first rate being lower than the second rate.

4. The method of claim 1 wherein in the fallback operating mode a superposition angle having an algebraic sign opposite to the steering-wheel setting angle is generated.

5. The method of claim 1 wherein operating the active steering system includes operation of an active rear-axle steering system.

6. The method of claim 5 wherein a rear-axle steer angle of the motor vehicle is predetermined in the normal operating mode in accordance with a first rear-axle steer response, and in the fallback operating mode with a second rear-axle steer response, different from the first rear-axle steer response.

7. The method of claim 6 wherein for a given steering-wheel setting angle the rear-axle steering system in the normal operating mode has a first rear-axle steer angle applied to it, and in the fallback operating mode has a second rear-axle steer angle applied to it, a difference between the first rear-axle steer angle and the second rear-axle steer angle having an algebraic sign opposite to the steering-wheel setting angle.

8. A system for operating a motor vehicle comprising:
an active roll control system;
an active steering system; and
a controller connected to said active roll control system and said active steering system, said controller receiving a signal from said active roll control system and detecting existence of a fault in said active roll control system, generating a signal based on said fault and sending said signal to said active steering system to operate the active steering system in a fallback operating mode in accordance with a fallback steer response, said fallback steer response different from a normal steer response; wherein the fallback steer response includes a fallback transmission ratio of the steering-wheel setting angle to the steer angle, and the normal steer response includes a normal transmission ratio of the steering-wheel setting angle to the steer angle, the fallback transmission ratio being greater than the normal transmission ratio.

9. The system of claim 8 wherein the active steering system includes an active front-axle steering system and an active rear-axle steering system.

10. The system of claim 8 wherein the active steering system includes an active front-axle steering system having a gearbox connected to a steering wheel and to a servomotor.

11. The system of claim 8 wherein the active steering system includes an active rear-axle steering system including having an electric motor that variably adjusts a rear-axle steer angle of the rear wheels via a rear rack.

12. The system of claim 10 wherein said gearbox combines a steering-wheel angle, predetermined by a driver based on the steering wheel, and a superposition angle, generated by the servomotor, and transmits the resultant steering angle to the front-axle steering system such that the superposition angle is superposed on the steering-wheel angle in accordance with the fallback steer response, and the steer angle of the motor vehicle is generated in a manner depending on the steering-wheel angle and the superposition angle.

13. The system of claim 10 wherein said electric motor variably adjusts a rear-axle steer angle of the rear wheels such that a rear-axle steer angle of the motor vehicle has a normal operating mode, having a first rear axle steer response and a fallback operating mode having a second rear axle steer response, said second rear axle steer response different from the first rear-axle steer response.

14. The system of claim 8 wherein in the fallback operating mode a superposition angle having an algebraic sign opposite to a steering-wheel setting angle is generated.

* * * * *